(12) United States Patent
Spickermann (10) Patent No.: US 7,085,500 B2
(45) Date of Patent: Aug. 1, 2006

(54) PROGRAMMABLE OPTICAL VECTOR MODULATOR AND METHOD FOR USE IN COHERENT OPTICAL COMMUNICATIONS

(75) Inventor: Ralph Spickermann, Redwood City, CA (US)

(73) Assignee: Lockheed Martin Corp., Bethesda, MD (US)

( * ) Notice: Subject to any disclaimer, the term of this patent is extended or adjusted under 35 U.S.C. 154(b) by 1069 days.

(21) Appl. No.: 09/845,557

(22) Filed: Apr. 30, 2001

(65) Prior Publication Data

US 2002/0159121 A1 Oct. 31, 2002

(51) Int. Cl.
*H04B 10/04* (2006.01)

(52) U.S. Cl. .............. 398/185; 398/183; 398/193; 398/188

(58) Field of Classification Search ........... 398/140, 398/141, 150, 158, 161, 182–183, 186–189, 398/191, 198, 185, 193; 359/237–238, 246, 359/276–279, 284–287, 300, 341.41; 370/212–215, 370/516–519; 372/26–28; 375/261, 268–273, 375/279, 295, 298–303, 320, 322, 329, 334
See application file for complete search history.

(56) References Cited

U.S. PATENT DOCUMENTS

| | | | | |
|---|---|---|---|---|
| 5,222,103 A | * | 6/1993 | Gross | 375/281 |
| 5,321,543 A | * | 6/1994 | Huber | 398/194 |
| 5,815,531 A | * | 9/1998 | Dent | 375/298 |

(Continued)

OTHER PUBLICATIONS

"On the Performance of Combined Quadrature Amplitude Modulation and Convolutional Codes for Cross–Coupled Multidimensional Channels," Kavehrad, M.; McLane, P.; Sundberg, C.–E.;□□Comm., IEEE Tran. , vol: 34, Issue: Dec. 12, 1986 pp:1190–1201□□.*
"Multiple–symbol differential detection of APSK based on MAP criterion," Machida, M.; Handa, S.; Oshita, S.; GLOBECOM 98. The Bridge to Global Integration. IEEE , vol: 5 , Nov. 8–12, 1998 pp:2740–2744 vol.5.*

(Continued)

*Primary Examiner*—Jason Chan
*Assistant Examiner*—Christina Y Leung
(74) *Attorney, Agent, or Firm*—Kenneth W. Float (57) ABSTRACT

A transmitter comprising a programmable optical vector modulator and method for coherent optical signal communication. The transmitter includes a transmitter laser whose output is coupled by way of an optical fiber to an amplitude modulator. The output of the amplitude modulator is coupled by way of a length of optical fiber to a phase modulator. The phase modulator generates a modulated light output from the transmitter. Amplitude modulation is achieved by inputting data and a data clock signal to amplitude symbol mapping logic whose outputs are selectively weighted, summed, amplified and input to the amplitude modulator to amplitude modulate the output of the transmitter laser. Phase modulation is achieved by inputting the modulating data and the data clock signal to phase angle symbol mapping logic whose outputs are selectively weighted, summed, amplified, delayed to synchronize with the arrival of the light from the amplitude modulator, and input to the phase modulator to phase modulate the amplitude modulated output of the transmitter laser. The programmability of the vector modulator allows the transmission of an M-ary modulation format that maximizes the data transmission for a given optical dynamic range and bit error rate target. Also, the programmability allows for rapid change in modulation format to maximize data transmission for changes in optical dynamic range and bit error rate target. The M-ary constellation may be predistorted to compensate for equipment piece part variation and fiber nonlinear effects; in particular the effect commonly known as "self-phase modulation".

20 Claims, 5 Drawing Sheets

U.S. PATENT DOCUMENTS

| | | | |
|---|---|---|---|
| 5,920,416 A * | 7/1999 | Beylat et al. | 398/185 |
| 5,946,119 A * | 8/1999 | Bergano et al. | 398/91 |
| 6,212,654 B1 * | 4/2001 | Lou et al. | 714/701 |
| 6,307,985 B1 * | 10/2001 | Murakami et al. | 385/24 |
| 6,310,709 B1 * | 10/2001 | Bergano | 398/185 |
| 6,317,249 B1 * | 11/2001 | Nakamoto et al. | 359/279 |
| 6,388,786 B1 * | 5/2002 | Ono et al. | 398/183 |
| 6,389,081 B1 * | 5/2002 | Shimizu et al. | 375/308 |
| 6,424,444 B1 * | 7/2002 | Kahn et al. | 398/141 |
| 6,445,476 B1 * | 9/2002 | Kahn et al. | 398/189 |
| 6,522,699 B1 * | 2/2003 | Anderson et al. | 375/295 |
| 2003/0012289 A1 * | 1/2003 | Lindoff | 375/262 |

OTHER PUBLICATIONS

"Constellation mappings for two-dimensional non-uniform signaling," Takahara, G.; Alajaji, F.; Hongyan Kuai; Beaulieu, N.C.; Information Theory, 2000. Proceedings. IEEE International Symposium on , Jun. 25–30, 2000 pp:165.*

* cited by examiner

PROGRAMMABLE OPTICAL VECTOR MODULATOR AND METHOD FOR USE IN COHERENT OPTICAL COMMUNICATIONS

BACKGROUND

The present invention relates generally to optical communication systems, and more particularly, to a programmable optical vector modulator and method for use in coherent optical communication systems.

The assignee of the present invention designs coherent optical communication systems for use in communicating data over optical links. The optical links of these coherent optical communication systems have varying nonlinearity and varying optical signal to noise ratios.

Prior art optical signaling almost exclusively involves the use of incoherent on-off keying. The few coherent links that have been realized are binary. The present invention provides for a technique for generating arbitrary M-ary constellations. This allows multiple bits/symbol and predistortion of the constellation to compensate for some link non-idealities.

Prior art binary signaling cannot adapt to changing link conditions. The currently evolving optically switched, all-optical transcontinental network requires transmitters that can be reprogrammed from hour to hour to transmit on any link from 300 km to 10,000 km in length. The available link optical dynamic range and link nonlinearity varies widely as the link length varies.

It would be desirable to have a transmitter and method that can maximize the data rate according to changing link conditions. One way to do this is to have a transmitter and method that can generate arbitrary M-ary constellations that allow multiple bits/symbol and/or predistortion of the constellation to aid in compensating for link non-idealities.

For example, if on a given day a transmitter is required to transmit on a relatively long link with a low optical signal to noise, Quadrature Phase Shift Keying might be the only choice to achieve the required bit error rate. However, if the next day the transmitter is to transmit on a shorter, higher optical signal to noise ratio link it may be advantageous to switch to 8-ary Phase Shift Keying or a 16-ary format to transmit more data. Another reason to switch to a higher order format is if the traffic changes to a lower quality of service level and more errors can be tolerated; that is, error rate can be traded for more data throughput.

It is therefore an objective of the present invention to provide such an improved transmitter that can maximize the data transmitted according to changing link conditions. This invention comprises a programmable optical vector modulator and method for use in coherent optical communication systems.

SUMMARY OF THE INVENTION

To accomplish the above and other objectives, the present invention provides for a transmitter comprising a programmable optical vector modulator that may be used in coherent optical communication systems. An exemplary programmable optical vector modulator comprises a transmitter laser for providing a laser beam; the output of which is connected with an amplitude modulator and a phase modulator in series. The amplitude modulator and phase modulator in series are used to modulate the beam into an arbitrary amplitude/phase state. Amplitude and phase state constellation generating electronics are coupled to the optical amplitude and phase modulators that are responsive to input data and a data clock signal. The amplitude and phase constellation electronics generate programmable voltage signals that are input into the amplitude and phase modulators.

The amplitude state constellation generating apparatus includes programmable amplitude symbol mapping logic that is responsive to input data and a data clock signal, weighting apparatus, summing apparatus, and amplifying apparatus that are used to generate the voltage signal input to the optical amplitude modulator. The constellation generating apparatus also includes phase angle symbol mapping logic that is responsive to the input data and the data clock signal, weighting apparatus, summing apparatus, amplifying apparatus, and an electrical delay line, all of which are used to generate the voltage signal input to the optical phase modulator. The electrical length of the delay line corresponds to the total delay of the laser light from the input of the amplitude modulator to the input of the phase modulator.

An exemplary optical transmitting method comprises the following steps. A laser beam is generated. A user defined set of voltages is generated in response to input data and a data clock signal that are used to drive the optical amplitude and phase modulators. The laser beam is first amplitude modulated using the appropriate voltage signal. The laser beam is then phase modulated using the appropriate voltage signal to produce an output beam modulated according to a constellation of amplitude and phase states.

The present invention may be used to maximize the data transmitted over an optical link with varying nonlinearity and varying optical signal to noise ratio. The present invention provides for a technique for generating arbitrary M-ary amplitude and phase state constellations. This allows multiple bits/symbol and/or predistortion of the constellation to compensate for link non-idealities. The programmable nature of the present invention allows the constellation to be changed through the use of software only without any changes in hardware. Thus, the transmitter can maximize the data rate to take full advantage of whatever optical dynamic range is currently available. The transmitter can also variably predistort the constellation to compensate for varying link distortion, in particular the nonlinear effect commonly known as "self-phase modulation".

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
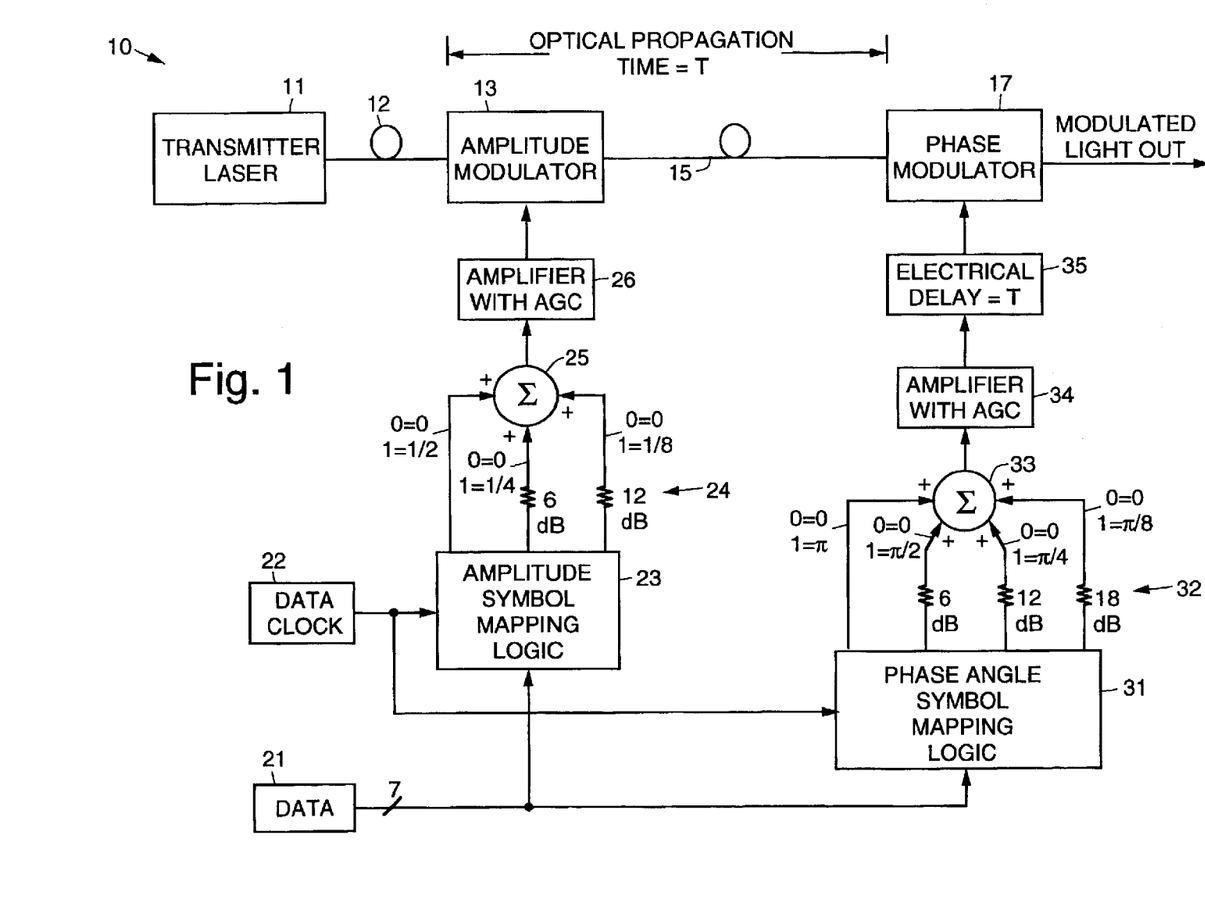
FIG. 1 is a block diagram illustrating a first embodiment of an exemplary transmitter in accordance with the principles of the present invention.

Referring to the drawing figures, FIG. 1 is a block diagram illustrating a first embodiment of an exemplary transmitter 10 in accordance with the principles of the present invention. The transmitter 10 comprises a programmable optical vector modulator 10. The transmitter 10 or programmable optical vector modulator 10 includes a transmitter laser 11, such as a fiber distributed feedback laser or semiconductor distributed feedback laser, for example. The output of the transmitter laser 11 is coupled by way of an optical fiber 12 to an amplitude modulator 13. The output of the amplitude modulator is coupled by way of a length of optical fiber 15 into a phase modulator 17 from which emerges modulated light output from the transmitter 10. The total optical propagation time from the entrance to the amplitude modulator 13 through the optical fiber 15 to the entrance of the phase modulator 17 is labeled "T".

Amplitude modulation of the output of the transmitter laser 11 is achieved by inputting a copy of data 21 to be transmitted and a data clock signal 22 to amplitude symbol mapping logic 23. Outputs of the amplitude symbol mapping logic 23 are selectively weighted 24, summed 25, amplified 26 and input to the amplitude modulator 13 to amplitude modulate the output of the transmitter laser 11.

Phase modulation of the delayed output of the transmitter laser 11 is achieved by inputting a copy of the modulating data 21 and the data clock signal 22 to phase angle symbol mapping logic 31. Outputs of the phase angle symbol mapping logic 31 are selectively weighted 32, summed 33, amplified 34, delayed 35 by the propagation time "T" (for example with a coaxial cable of appropriate length), and input to the phase modulator 17 to phase modulate the amplitude modulated output of the transmitter laser 11. The electrical delay 35 is chosen to give the same path delay "T" as the optical path delay through the optical amplitude modulator 13 and interconnecting fiber 15. In this way, the amplitude and phase modulation corresponding to a given word of the data 21 is applied to the same interval of the laser beam.

Figure 2:
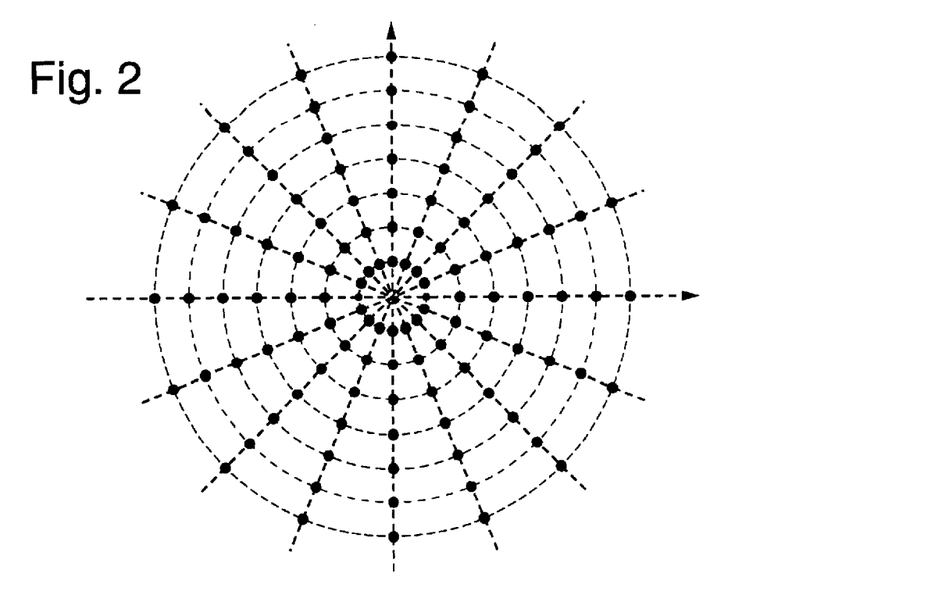
FIG. 2 illustrates a constellation output by the transmitter shown in FIG. 1.

The specific implementation of the weighting 32 of the programmable optical vector modulator 10 shown in FIG. 1 provides three bits of amplitude modulation (allowing eight amplitude levels), and four bits of phase modulation (allowing sixteen phase angles). Each increment of 6 dB of weighting 32 reduces the voltage by an additional compounded factor of ½. More particularly, the transmitter 10 shown in FIG. 1 maps out 7 bits per symbol. FIG. 2 illustrates the available constellation points output by the transmitter 10 shown in FIG. 1.

The 7 parallel bits of data 21 are input into two logic function blocks comprising the amplitude symbol mapping and phase angle symbol mapping logic 23, 31. In the exemplary transmitter 10, there are 8 amplitude states (=3 bits of resolution) to choose from and 16 angle states (=4 bits of resolution). The logic is programmed such that a Grey code results. In particular, adjacent symbol states on the constellation (shown in FIG. 2) is made to differ by only 1 bit so that the most likely symbol errors result in only 1 bit error. There are many permutations possible to achieve this, which are well known by those skilled in the art.

The voltage outputs of the logic function implemented by the amplitude symbol and phase angle symbol mapping logic 23, 31 are weighted 24, 32 and respectively summed 25, 33 to yield the constellation. In this example, the weighting 24, 32 is geometrical. Each increment 6 dB of attenuation reduces the voltage by an additional compounded factor of ½.

For the amplitude function implemented by the amplitude symbol mapping logic 23, a binary output of 000 to the weighting circuitry 24 yields a normalized total voltage into the voltage summer 25 of 0. A binary 100 yields ½, a 110 yields ¾, a 111 yields ⅞, a 010 yields ¼, and so on. The normalized total amplitude voltage output from the summer 25 is amplified 26 such that the amplitude modulator 13 attenuates the signal in proportion to the normalized voltage output by the voltage summer 25.

The phase angle symbol mapping logic 31 works similarly. In the symbol mapping logic 31, a 0000 results in a 0 degree phase shift, a 1000 causes a 180 degree phase shift, a 1100 causes a 270 degree phase shift, and so forth.

If the electrical delay 24, 32 in the output paths of the amplitude and phase mapping logic 23, 31 is not the same, the electrical delay 35 must be adjusted to compensate so that the amplitude and phase modulation corresponding to the given data word 21 is applied to the same interval of the laser beam.

Figure 3:
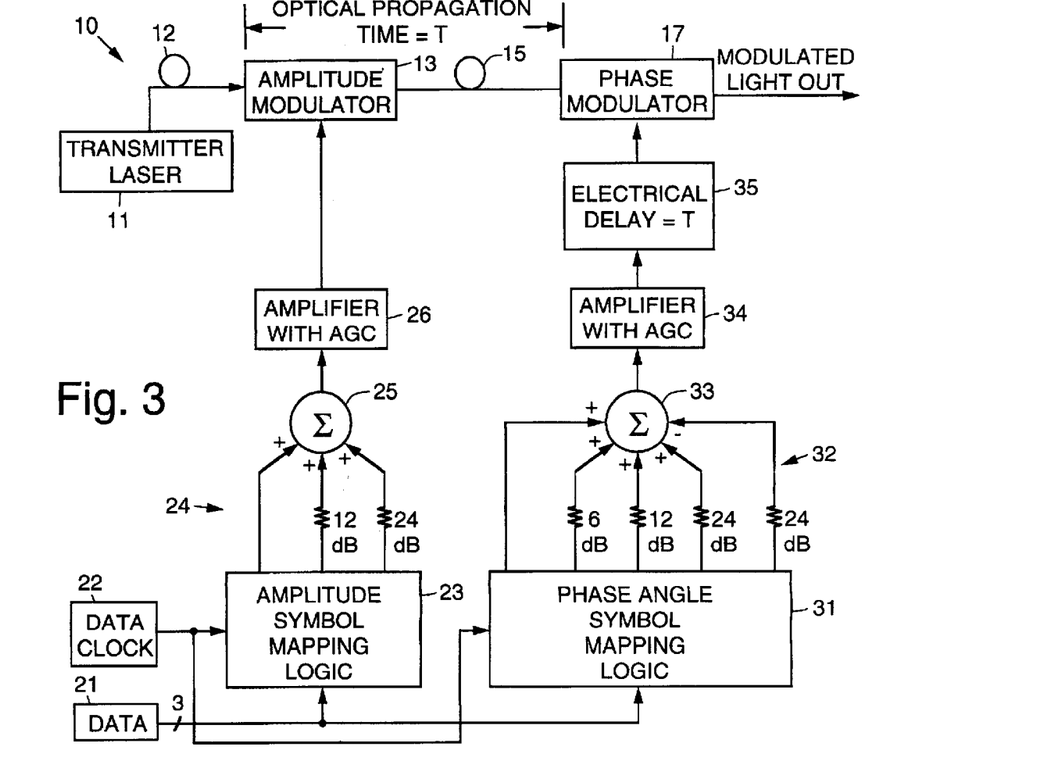
FIGS. 3 and 4 illustrate how the constellation shown in FIG. 2 may be optimized to cluster the data states to concentrate on specific modulation schemes by adjusting the amplitude and phase weighting.
Figure 4:
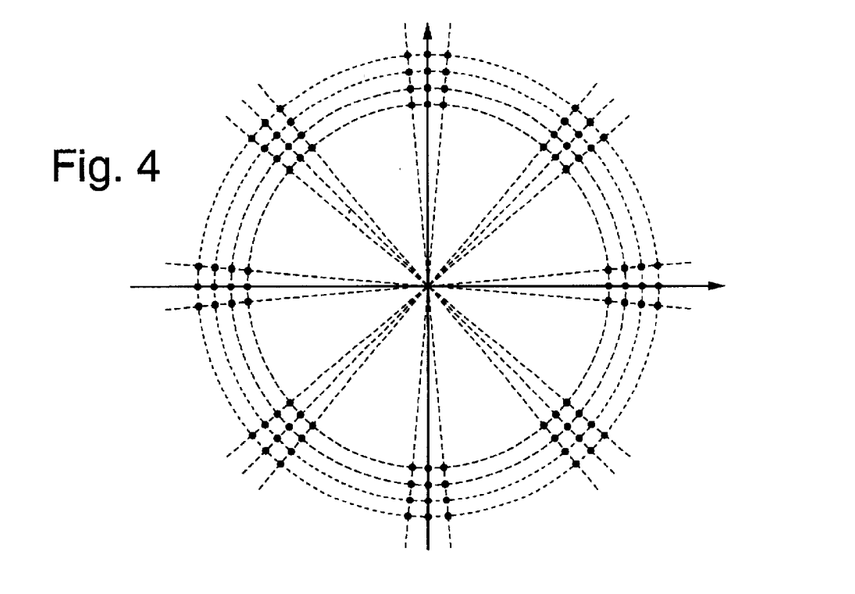

FIGS. 3 and 4 illustrate how the constellation may be optimized to cluster the amplitude and phase states to concentrate on a specific modulation scheme by altering the amplitude and phase weighting. FIG. 3 shows the transmitter 10 with amplitude and phase sets adjusted to give the capability to predistort in the vicinity of an 8-ary phase constellation. FIG. 4 illustrates the resulting map of available states.

This clustering is useful if the modulation scheme and the approximate range of distortions thereof are known beforehand. By choosing the allowed constellation states appropriately, the best results from the least complex symbol mapping logic can be obtained. An example of this kind of pre-adjustment of the constellation would be custom adjustment of the amplitude (constellation radius) weighing to account for device to device variation and nonlinear response of the optical amplitude modulator 13. For example, a commonly used Mach-Zehnder type optical amplitude modulator 13 has a nonlinear cosine-squared response versus input voltage.

Figure 5:
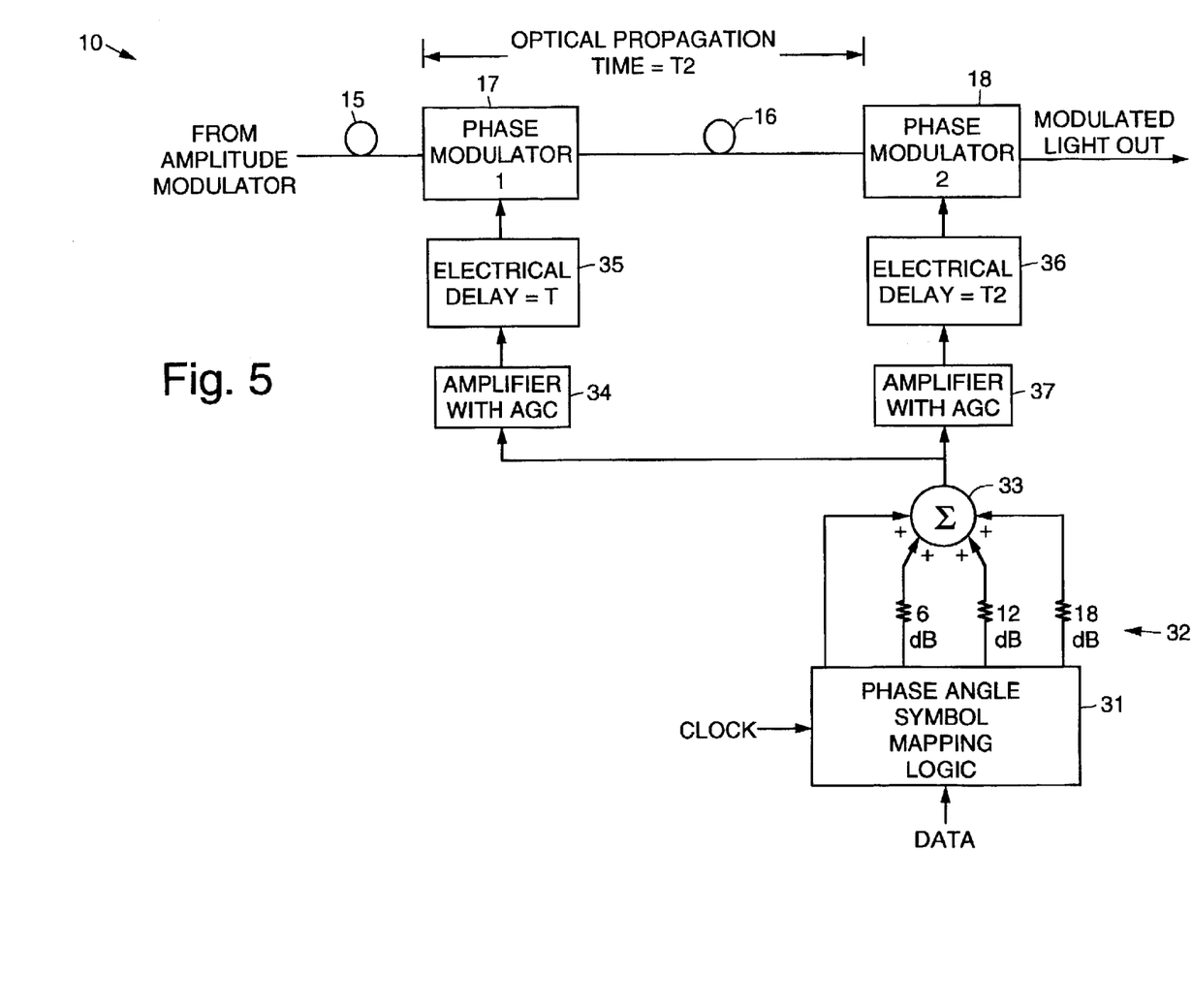
FIG. 5 is a block diagram showing a portion of a second embodiment of an exemplary transmitter in accordance with the principles of the present invention.

FIG. 5 is a block diagram showing the phase modulator portion of a second embodiment of an exemplary transmitter 10 in accordance with the principles of the present invention. This phase modulator is geometrically weighed like FIG. 1. This embodiment is useful if an electrical amplifier 34 does not generate enough voltage to drive a single phase modulator 17 to the maximum phase angle required by the modulation scheme. This second embodiment of the transmitter 10 uses two identical phase modulators 17, 18 in series coupled together by a length of optical fiber 16.

The phase angle symbol mapping logic 31 provides a set of outputs that are selectively weighted 32, summed 33, and then split into two copies. The copies are amplified 34, 37 and delayed 35, 36 by times "T" and "T2" respectively. The delays T, T2 into the first and second phase modulators 17, 18 are chosen so that the phase modulation of the two phase modulators 17, 18 in series is applied to the interval of the laser beam corresponding to the data word being transmitted. The second phase modulator 18 is the last step in generating the modulated light output from the transmitter 10.

If a geometrical weighting function constellation (such as FIG. 2) is used with many bits of resolution, a very dense mesh of points is established. The logic 23, 31 may then be programmed to make a virtually arbitrary constellation. In other words, if there are 4 bits of data per symbol to be transmitted, a constellation is needed with 16 points (16-ary constellation). However, if the weighting scheme establishes a uniformly spaced fine mesh of 512 or 1024 constellation points from which the logic 23, 31 may be programmed to choose, a practically arbitrary choice of constellations of 16 points can be selected. Moreover, the constellation may be altered virtually instantly to an 8-ary or 4-ary format by changing the programming of the logic 23, 31. The density of mesh points is increased by increasing the number of amplitude and phase taps 24, 32 that the symbol mapping logic 23, 31 has to work with. For instance, instead of 0 dB, 6 dB, and 12 dB amplitude taps, one could have 0 dB, 6 dB, 12 dB, 18 dB, 24 dB and 30 dB for 6 bits of amplitude resolution, with similar phase taps.

Figure 6:
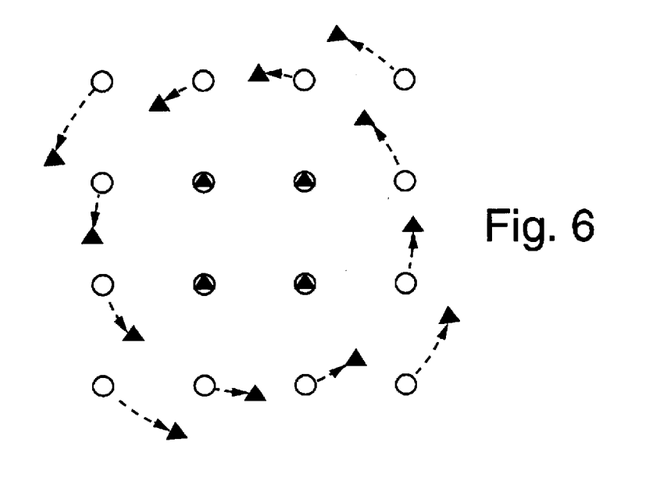
FIG. 6 is an illustration of the effect of "self-phase modulation" fiber nonlinearity on a 16-QAM constellation.
Figure 6A:
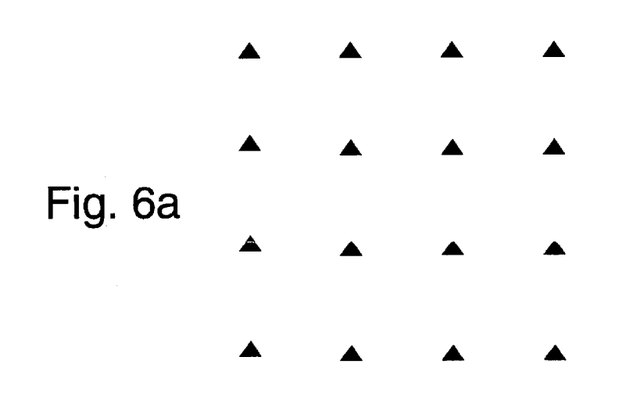
FIG. 6a is an illustration of the desired received 16-QAM constellation.
Figure 7:
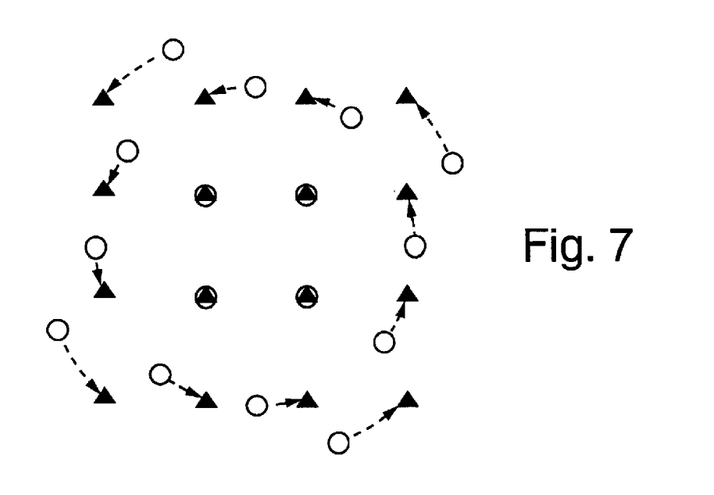
FIG. 7 illustrates how a 16-QAM constellation may be predistorted to compensate for the "self-phase modulation" nonlinearity.

As an example of the use of such a very dense constellation mesh, FIGS. 6 and 7 illustrate the utility of predistorting a 16-QAM constellation to compensate for the "self-phase modulation" nonlinearity in optical fiber. Self-phase modulation in an optical fiber is a change in optical phase proportional to the intensity of the optical symbol. As is shown in FIG. 6, the effect of this is that the outermost, highest intensity points of the 16-QAM constellation are rotated in phase relative to the inner points. The amount of phase rotation is proportional to the intensity (radius) of the constellation point. In FIG. 6, the circles indicate the transmitted constellation, whereas the triangles indicate the corresponding received distorted constellation after propagation through a fiber link subject to self-phase modulation. FIG. 6a illustrates the desired received 16-QAM constellatioin. FIG. 7 illustrates the result of transmitting a constellation pre-rotated such that a clean 16-QAM signal is received. In FIG. 7 again the transmitted constellation is indicated by the circles and the received constellation are triangles.

Figure 8:
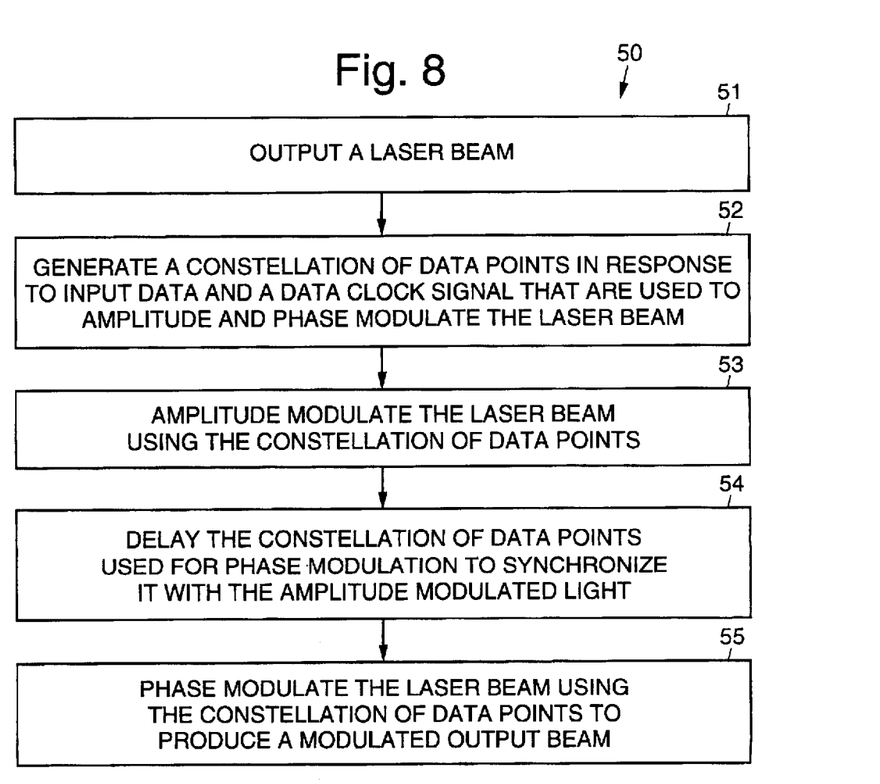
FIG. 8 is a flow diagram illustrating an exemplary method in accordance with the principles of the present invention.

FIG. 8 is a flow diagram illustrating an exemplary method 50 in accordance with the principles of the present invention. The method 50 comprises the following steps. A laser beam is output 51. A constellation of data points is generated 52 in response to input data and a data clock signal that is used to amplitude and phase modulate the laser beam. The laser beam is amplitude modulated 53 according to the constellation of data points. The constellation of data points used for phase modulation is delayed 54 to synchronize it with the amplitude modulated laser beam. The laser beam is phase modulated 55 using the delayed constellation of data points to produce a modulated output beam.

Thus, a programmable optical vector modulator transmitter and method for use in coherent optical communication systems have been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A programmable system for transmitting an arbitrary M-ary modulated optical signal comprising:
    a transmitter laser for providing a laser beam;
    an amplitude modulator for amplitude modulating the laser beam;
    an optical fiber for coupling the laser beam to the amplitude modulator;
    a phase modulator in series with the amplitude modulator for phase modulating the amplitude modulated laser beam;
    an optical fiber coupled between the amplitude modulator and the phase modulator;
    programmable constellation generating apparatus that is responsive to input data and a data modulator clock signal for programmably generating an arbitrary M-ary amplitude modulated and/or phase shift keyed constellation of data points that are input to the amplitude and phase modulator to amplitude and phase modulate the laser beam; and
    an electrical delay for synchronizing the arrival of the amplitude modulated light at the phase modulator with a signal from a phase angle portion of the constellation generating apparatus arriving at the phase modulator.

2. The system recited in claim 1 wherein the amplitude portion of the programmable constellation generating apparatus comprises programmable amplitude symbol mapping logic that is responsive to input data and a data clock signal, weighting apparatus, summing apparatus, and amplifying apparatus, and wherein the phase portion of the programmable constellation generating apparatus comprises programmable phase symbol mapping logic that is responsive to input data and a data clock signal, weighting apparatus, summing apparatus, and amplifying apparatus.

3. The system recited in claim 1 wherein the amplitude portion of the programmable constellation generating apparatus comprises programmable amplitude symbol mapping logic that is responsive to input data and a data clock signal, weighting apparatus, summing apparatus, and amplifying apparatus.

4. The system recited in claim 1 wherein the phase portion of the programmable constellation generating apparatus comprises programmable phase angle symbol mapping logic that is responsive to the input data and the data clock signal, weighting apparatus, summing apparatus, amplifying apparatus, and delaying apparatus.

5. The system recited in claim 1 wherein the modulation format of the optical signal of an optical link is reconfigured to maximize data transmission for a varying allowed bit error rate and varying available link optical dynamic range.

6. The system recited in claim 1 which predistorts the transmitted constellation to compensate for nonlinearity in the optical link.

7. The system recited in claim 1 which predistorts the transmitted constellation to compensate for self-phase modulation.

8. The system recited in claim 1 which compensates for performance variations in the components of a communication link.

9. An optical transmitting method comprising the steps of:
    outputting a laser beam;
    programmably generating an arbitrary M-ary constellation of data points in response to input data and a data clock signal that are used to amplitude and phase modulate the laser beam;
    amplitude modulating the laser beam corresponding to arbitrary M-ary constellation of data points;
    delaying the arbitrary M-ary constellation of data points used for phase modulation to synchronize it with the amplitude modulated laser beam;
    phase modulating the amplitude modulated laser beam corresponding to delayed arbitrary M-ary constellation of data points to produce an output beam.

10. The optical transmitting method recited in claim 9 wherein the arbitrary M-ary constellation of data points comprises a Grey code.

11. A programmable system for transmitting an arbitrary M-ary modulated optical signal comprising:
   an amplitude modulator for amplitude modulating an optical signal;
   a phase modulator for phase modulating the optical signal; and
   a programmable constellation generating apparatus for programmably generating an amplitude control signal and a phase control signal from an input data signal, wherein the amplitude control signal is input to the amplitude modulator and the phase control signal is input to the phase modulator, together the amplitude control signal and the phase control signal comprising an arbitrary M-ary constellation of data points such that the amplitude and phase, modulated optical signal is an arbitrary M-ary modulated optical signal.

12. The system according to claim 11, wherein the amplitude modulator modulates the optical signal before the phase modulator modulates the optical signal and the system further comprising a delay, the delay delaying the phase control signal to synchronize the phase modulation of the optical signal with a delay between the amplitude modulator and the phase modulator.

13. The system according to claim 11, wherein the phase modulator modulates the optical signal before the amplitude modulator modulates the optical signal and the system further comprising a delay, the delay delaying the amplitude control signal to synchronize the amplitude modulation of the optical signal with a delay between the phase modulator and the amplitude modulator.

14. The system according to claim 11, wherein an amplitude control signal generating portion of the programmable constellation generating apparatus includes an adaptable amplitude symbol mapping logic.

15. The system according to claim 14, wherein the amplitude symbol mapping logic, has a plurality of outputs, the outputs being weighted and combined to form the amplitude control signal.

16. The system according to claim 11, wherein a phase control signal generating portion of the programmable constellation generating apparatus includes an adaptable phase symbol mapping logic.

17. The system according to claim 16, wherein the phase symbol mapping logic has a plurality of outputs, the outputs being weighted and combined to form the phase control signal.

18. The system according to claim 11, wherein the programmable constellation generating apparatus is reconfigured to generate respective amplitude control and phase control signals to produce an optical signal for maximizing data transmission over present optical link conditions.

19. The system according to claim 11, wherein the programmable constellation generating apparatus is reconfigured to generate respective amplitude control and phase control signals to produce a predistorted optical signal.

20. The system according to claim 19, wherein the predistortion compensates for one or more factors selected from nonlinearity in an optical link, self-phase modulation and performance variations in components of a communications link.

* * * * *